United States Patent [19]
Gabriel-Robez

[11] 3,868,092
[45] Feb. 25, 1975

[54] CHEESE KETTLE OR EQUIVALENT

[75] Inventor: Roland Gabriel-Robez, Helsinki, Finland

[73] Assignee: MKT-tehtaat Oy, Helsinki, Finland

[22] Filed: Jan. 5, 1973

[21] Appl. No.: 321,256

[30] Foreign Application Priority Data
Nov. 29, 1972 Finland.............................. 3369/72

[52] U.S. Cl...................... 259/120, 99/348, 99/452
[51] Int. Cl............................................... B01f 7/30
[58] Field of Search .......... 259/120, 119, 121, 122, 259/116, 117, 107, 108; 99/348, 452

[56] References Cited
UNITED STATES PATENTS
| | | | |
|---|---|---|---|
| 717,887 | 1/1903 | Messer.............................. | 259/120 |
| 928,397 | 7/1909 | Nelson.............................. | 259/120 |
| 948,214 | 2/1910 | Fisher.............................. | 259/120 |

Primary Examiner—Robert W. Jenkins
Attorney, Agent, or Firm—Toren, McGeady and Stanger

[57] ABSTRACT

A cheese kettle or other equivalent upright, enclosed tank provided with stirrers and having an upwardly conically tapering cover, whereupon is disposed the drive means for the stirrers, the drive shaft of the stirrers that departs from this drive means passing through the cover. The cover consists of a truncated cone, at the mouth of which there starts a downwardly tapering truncated cone, the drive means for the stirrers being disposed upon a bottom plate in this latter cone.

3 Claims, 2 Drawing Figures

CHEESE KETTLE OR EQUIVALENT

SUMMARY OF THE INVENTION

Cheese kettles having an upwardly conically tapering cover are known in prior art. Tanks of similar type are also used in other kinds of foodstuff industry when it is necessary to stir a large quantity of liquid.

The cover of the kettle has the shape of an upwardly tapering cone in order that it might take up the weight of the drive means and stirrers without requiring reinforcment of the cover by particular reinforcing structures and without implying great thickness of the sheet material from which the cover is made.

On the other hand, the cover having the shape of an upwardly tapering cone causes certain drawbacks. These include the facts that the total height of the kettle is comparatively great and that the drive shaft departing from the drive means to the stirrers is comparatively long.

The aim of the present invention is to provide a kettle which is free from the above-mentioned drawbacks. The invention is characterized in that the cover consists of a truncated cone, at the mouth of which starts a downwardly tapering truncated cone, the drive means for the stirrers being disposed upon a bottom plate in this latter cone.

Owing to its shape, the cheese kettle cover according to the invention is extremely rigid, whence follows that it can be made of comparatively thin sheet material, whereby the manufacturing costs are low. The cheese kettle has a low structural height, because the drive means for the stirrers is disposed within a pit formed by the downwardly directed tapering cone. At the same time, the drive means is well-protected. The drive shaft extending from the drive means to the stirrers is short.

According to an advantageous embodiment of the invention, the height of the upwardly tapering truncated cone is approximately twice that of the downwardly tapering truncated cone. Hereby a suitable amount of space is left under the bottom plate of the downwardly tapering truncated cone for the radial arms of the stirrers.

According to another advantageous embodiment, the apex angle of the upwardly tapering truncated cone is larger than that of the downwardly tapering truncated cone. In other words, the wall of the downwardly tapering truncated cone ascends more steeply, for which reason it is easier to accommodate the drive means within it. The apex angle of the upwardly tapering truncated cone may be on the order of 110° to 150° and the apex angle of the downwardly tapering truncated cone may be on the order of 70° to 110°.

The invention is described in the following with the aid of an example, with reference to the attached drawing, wherein

DETAILED DESCRIPTION OF THE INVENTION

Figure 1:
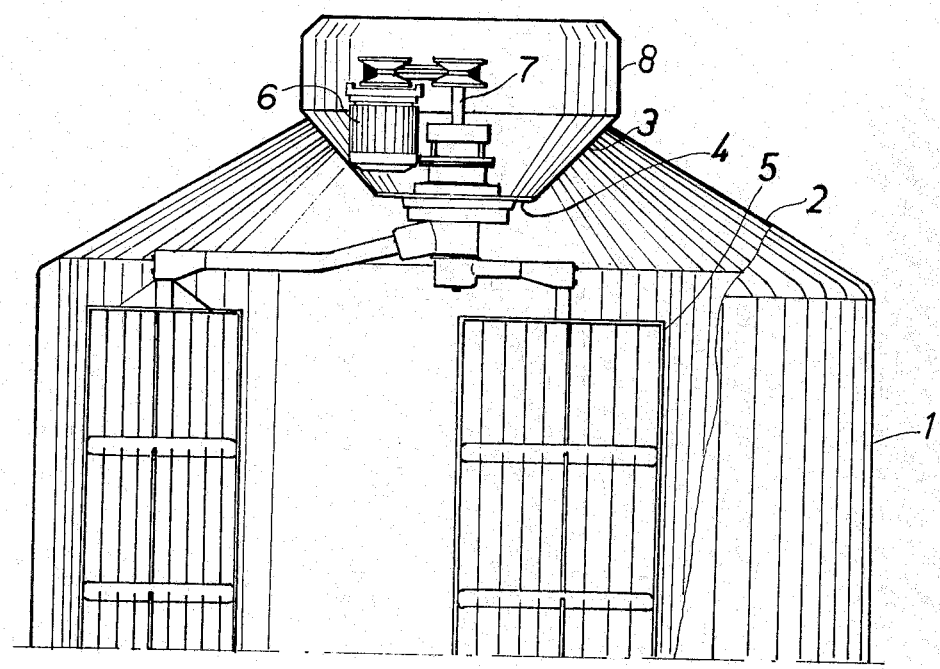
FIG. 1 presents a cylindrical cheese kettle, partly in longitudinal section.

In FIG. 1, the reference numeral 1 indicates the wall of a cylindrical cheese kettle, at the upper rim of which wall there starts a cover part 2 shaped as a truncated cone and which tapers in the upwardly direction. At the mouth of this there starts a downwardly tapering truncated cone 3 having a bottom plate 4. Upon the bottom plate 4 the drive means for the stirrers 5 has been placed, which consists of a motor 6 driving over a gear transmission (not depicted) the drive shaft 7. The drive means 6 lies protected within the pit formed by the truncated cone 3. Furthermore, an upwardly directed protecting hood 8 starts from the upper edge of this truncated cone 3.

In the case illustrated by FIG. 1, the height of the upwardly tapering truncated cone, or of the cover part 2, is approximately twice that of the downwardly tapering truncated cone 3. The apex angle of the upwardly tapering truncated cone 2 is about 120 degrees and the apex angle of the downwardly tapering truncated cone 3 is about 90 degrees.

Figure 2:
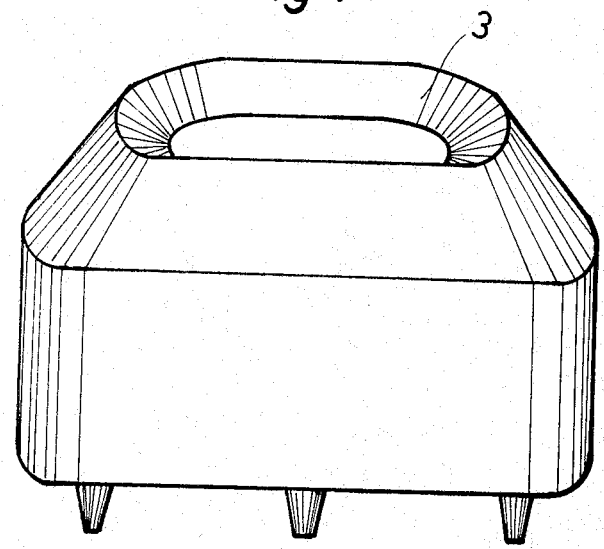
FIG. 2 presents as a perspective drawing a cheese kettle which has a cross section which is not circular, but nearly elliptic.

The case shown in FIG. 2 differs from FIG. 1 in that the cross section of the cheese kettle is roughly elliptic, whereby the pit formed by the downwardly tapering truncated cone 3 is also elliptic. In this pit two drive shafts have been fitted, indicated with crosses. The drive shafts may derive their motion from a common drive means or from separate drive means.

It is obvious to one skilled in the art that different embodiments of the invention may vary within the scope of the patent claims set forth hereinbelow. For instance, the cross section may be, except cylindrical or elliptic, also in the shape e.g. of a triangle or square with rounded corners.

I claim:

1. An improvement in a cheese kettle or other equivalent upright enclosed tank comprising stirrers, an upwardly arranged conically shaped cover, drive means for the stirrers including a drive shaft passing through the cover and connected to said stirrers, wherein the improvement comprises that said cover includes a first truncated cone terminating in a mouth at its upper end and a second truncated cone tapering inwardly in the downward direction and having a bottom plate, said second truncated cone connected to and extending downwardly from said mouth within said first truncated cone, said drive means mounted within said second truncated cone on said bottom plate, and said first truncated cone having a height approximately twice that of said second truncated cone and a larger apex angle than said second truncated cone.

2. Cheese kettle or other equivalent tank according to claim 1, characterized in that the apex angle of the upwardly tapering first truncated cone is between 110° and 150° and the apex angle of the second truncated cone is between 70° and 110°.

3. The improvement according to claim 1, further comprising an upwardly extending hood mounted at its lower end on the upper end of said second truncated cone and extending upwardly above said mouth of said first truncated cone for protecting said drive means.

* * * * *